(12) United States Patent
Tsubokura et al.

(10) Patent No.: US 6,943,857 B2
(45) Date of Patent: Sep. 13, 2005

(54) LIQUID CRYSTAL DISPLAY DEVICE

(75) Inventors: Masaki Tsubokura, Mobara (JP); Shinji Matsumoto, Ooamishirasato (JP)

(73) Assignee: Hitachi, Ltd., Tokyo (JP)

( * ) Notice: Subject to any disclaimer, the term of this patent is extended or adjusted under 35 U.S.C. 154(b) by 217 days.

(21) Appl. No.: 10/207,969

(22) Filed: Jul. 31, 2002

(65) Prior Publication Data

US 2003/0031453 A1 Feb. 13, 2003

(30) Foreign Application Priority Data

Aug. 8, 2001 (JP) ........................................ 2001-240426

(51) Int. Cl.[7] ............................................ G02F 1/1335
(52) U.S. Cl. ........................ 349/112; 349/65; 349/70; 362/613; 362/623
(58) Field of Search ............................ 349/112, 62, 63, 349/65, 70; 362/31, 27

(56) References Cited

U.S. PATENT DOCUMENTS 5,178,447 A * 1/1993 Murase et al. ................ 362/31

* cited by examiner

*Primary Examiner*—Robert H. Kim
*Assistant Examiner*—Richard H Kim
(74) *Attorney, Agent, or Firm*—Reed Smith LLP; Stanley P. Fisher, Esq.; Juan Carlos A. Marquez, Esq.

(57) ABSTRACT

In a liquid crystal display device comprising a pair of linear light source arranged at respective side surface of a light guide plate opposite to one another and having brightness irregularity along longitudinal axes thereof, the present invention arranges the linear light sources to dispose respective ends thereof towards which the brightness thereof is decreased gradually diagonally over a main surface of the light guide plate, and provide two-dimensional optical reflection or diffusion pattern density of which is varied in accordance with the brightness irregularity thereof on at least one surface of the light guide plate, an optical diffusion sheet, or an optical reflection plate. The brightness irregularity appearing in a display screen of the liquid crystal display device due to the brightness irregularity of the linear light source is eliminated by the present invention.

6 Claims, 6 Drawing Sheets

LIQUID CRYSTAL DISPLAY DEVICE

BACKGROUND OF THE INVENTION

1. Field of the Invention

The present invention relates to a liquid crystal display device and, more particularly, to a liquid crystal display device which has a liquid crystal display panel, a light guide disposed on the back surface of the liquid crystal display panel, and linear light sources respectively disposed along a pair of side edges of the light guide.

2. Description of the Related Art

A liquid crystal display device capable of providing high-resolution and color display for notebook personal computers and computer monitors is provided with a light source which illuminates a liquid crystal display panel from the back surface thereof (that is, a backlight). A generally known type of illumination light source for the liquid crystal display panel is a side edge backlight in which a linear light source is disposed along a side (side edge) of a planar light guide plate or a direct backlight in which a plurality of linear light sources are directly disposed on the back surface of the liquid crystal display panel.

The side edge backlight includes at least one linear light source disposed along at least one side edge of a light guide plate made of a transparent plate such as an acrylic plate, and an optical sheet made of an optical diffusion plate or a prism sheet stacked on a liquid-crystal-panel side of the light guide plate. The assembly of these members is hereinafter referred to as a backlight structure. This backlight structure is housed in a lower case, and after a liquid crystal display panel has been stacked on the backlight structure, a metal upper case having a display window is placed on and joined to the lower case, whereby the backlight structure and the liquid crystal display panel as well as the lower and upper cases are integrated as a liquid crystal display device (that is, a liquid crystal display module). In general, a so-called cold cathode fluorescent lamp is used as the linear light source.

FIG. 8 is a cross-sectional view diagrammatically illustrating the essential structure of a liquid crystal display device using a backlight structure having cold cathode fluorescent lamps respectively disposed along two opposite side edges of a light guide plate. In FIG. 8, reference symbol BL denotes the backlight structure, and cold cathode fluorescent lamps CFL1 and CFL2 are respectively disposed along two opposite sides of a planar light guide plate GLB which is suitably made of an acrylic resin. The cold cathode fluorescent lamps CFL1 and CFL2 are respectively provided with lamp reflection sheets LS1 and LS2, and an optical reflection sheet RF is provided on a second main surface (back surface) of the light guide plate GLB.

An optical diffusion sheet SPS and a prism sheet PRS are stacked on a first main surface (top surface) of this light guide plate GLB, and a liquid crystal display panel PNL is stacked on the prism sheet PRS with one main surface of the liquid crystal display panel PNL opposed to the prism sheet PRS. The liquid crystal display panel PNL includes a liquid crystal layer sealed between a pair of substrates SUB1 and SUB2, and polarizers POL1 and POL2 are respectively provided on the one main surface (a surface opposed to the light guide plate GLB) and another main surface (an image-display-side surface) of the liquid crystal display panel PNL.

FIG. 9 is a developed perspective view illustrating the entire construction of the liquid crystal display device provided with the side edge backlight. This liquid crystal display device is formed by housing into a lower case MCA the liquid crystal display panel PNL, the light guide plate GLB, the cold cathode fluorescent lamps CFL1 and CFL2 and an optical sheet made of the optical diffusion sheet SPS and the prism sheet PRS, placing an upper case SHD which is a frame-shaped member onto the lower case MCA, and securing, by caulking, pawls NL provided at the periphery of the upper case SHD to engagement portions NA of the lower case MCA to integrate the upper case SHD and the lower case MCA. This engagement is effected by folding the pawls NL inward of the engagement portions NA.

In this side edge type of backlight structure, the thickness and the weight of the light guide plate occupy most of the thickness and the weight of the backlight structure. In recent years, as liquid crystal display modules are reduced in thickness and power consumption, light guide plates are being reduced in thickness. If the thickness of a light guide plate is reduced, the amount of light obtained from one linear light source becomes insufficient, so that one or more linear light sources need to be used on two opposite sides of the light guide plate.

SUMMARY OF THE INVENTION

A cold cathode fluorescent lamp is a low-pressure discharge tube which includes a glass or ceramic elongated tube having an inside surface coated with a fluorescent material and containing mercury sealed in the inside. In the manufacturing process of the cold cathode fluorescent lamp, after the inside wall of the elongated tube has been coated with fluorescent slurry, an air flow is circulated in the elongated tube to effect drying of the slurry. At this time, the thickness of the fluorescent material is gradually decreased in the exhaust direction of the air flow. As a result, the cold cathode fluorescent lamp tends to exhibit a one-dimensional brightness irregularity relative to the tube-axis direction of the cold cathode fluorescent lamp; that is, the cold cathode fluorescent lamp becomes darker (smaller in brightness) in the exhaust direction, and brighter (larger in brightness) in the opposite direction to the exhaust direction.

In addition, as the thickness of the light guide plate GLB becomes smaller, the brightness distribution of the cold cathode fluorescent lamp relative to the tube-axis direction thereof is impaired. Accordingly, when such cold cathode fluorescent lamps are mounted along both side edges of the light guide plate GLB with their exhaust directions placed on the same side, the two-dimensional brightness distribution of a liquid crystal display panel exhibits an irregular on-screen brightness distribution (the irregularity of the two-dimensional brightness distribution) in which the area of the liquid crystal display panel that is located in the exhaust direction becomes smaller in brightness than the area of the liquid crystal display panel that is located in the opposite direction to the exhaust direction. This irregularity of the two-dimensional brightness distribution occurs not only in the case where the cold cathode fluorescent lamps are used as linear light sources, but similarly occurs in the case where other linear light sources such as LED arrays are used and one-dimensional brightness distributions respectively exist at one end of either of the linear light sources and at another end of the linear light sources.

The invention provides a liquid crystal display device in which the irregularity of the on-screen brightness distribution of the liquid crystal display panel is solved to level the on-screen brightness distribution.

Therefore, according to the invention, two linear light sources each of which has a one-dimensional brightness distribution decreasing gradually from one end of the linear light source toward another end thereof are arranged at respective sides of a main surface of a light guide plate opposite to one another, so that the one ends of the linear light sources are on a diagonal of the main surface of the light guide plate, respectively. Moreover, distribution density of an optical reflection pattern provided two-dimensionally on one of main surfaces of the light guide plate is varied (increased) gradually along the diagonal in accordance with the one-dimensional distributions (gradual decreases) of the respective brightness of the linear light sources.

In addition, in the invention, instead of varying the optical reflection pattern provided on the light guide plate, the distribution density of the optical diffusion pattern of an optical diffusion sheet disposed between the light guide plate and the liquid crystal display panel may be varied gradually along the diagonal in accordance with the one-dimensional distributions of the respective brightness of the linear light sources.

In addition, in the invention, instead of varying the optical reflection pattern provided on the light guide plate or the optical diffusion pattern of the optical diffusion sheet, the distribution density of the optical reflection pattern of an optical reflection plate provided along a second main surface of the light guide plate may be varied gradually along the diagonal in accordance with the one-dimensional distributions of the respective brightness of the linear light sources.

Representative structures of the liquid crystal display device according to the invention will be described below.

A structure (1) of the liquid crystal display device includes:

a liquid crystal display panel having one and another main surfaces;

a guide light plate having a first main surface being opposite to the one main surface of the liquid crystal display panel and a second main surface on which an optical reflection pattern is formed to be distributed two-dimensionally; and linear light sources being disposed along respective side edges of the first or second main surfaces of the light guide plate being opposite to one another.

Brightness of each of the linear light sources increases one-dimensionally and gradually from one end of the linear light source toward another end thereof, and the respective one ends of the linear light sources are arranged on a diagonal of the first or second main surface of the light guide plate.

Distribution density of the optical reflection pattern provided two-dimensionally for the light guide plate is heightened gradually along the diagonal in accordance with the one-dimensional gradual decreases of the respective brightness of the linear light sources.

The brightness irregularity of each of the linear light sources relative to the one-dimensional direction (tube-axis direction) thereof is corrected by the density distribution of the optical reflection pattern provided on the light guide plate, whereby the two-dimensional brightness distribution on another main surface of the liquid crystal display panel becomes regular so that a regular on-screen brightness distribution can be obtained.

A structure (2) of the liquid crystal display device includes:

a liquid crystal display panel having one and another main surfaces;

a light guide plate having first and second main surfaces and being arranged to confront the first main surface thereof with the one main surface of the liquid crystal display panel;

linear light sources being disposed along respective side edges of the first or second main surfaces of the light guide plate being opposite to one another; and an optical diffusion sheet having a two-dimensional optical diffusion pattern and being arranged between the one main surface of the liquid crystal display panel and the first main surface of the light guide plate.

Brightness of each of the linear light sources increases one-dimensionally and gradually from one end of the linear light source toward another end thereof, and the respective one ends of the linear light sources are arranged on a diagonal of the first or second main surface of the light guide plate.

Distribution density of the optical diffusion pattern provided two-dimensionally for the optical diffusion sheet is heightened gradually along the diagonal in accordance with the one-dimensional gradual decreases of the respective brightness of the linear light sources.

The brightness irregularity of each of the linear light sources relative to the one-dimensional direction (tube-axis direction) thereof is corrected by the distribution of the optical diffusion pattern provided on the optical diffusion sheet, whereby the two-dimensional brightness distribution on another main surface of the liquid crystal display panel becomes regular so that a regular on-screen brightness distribution can be obtained.

A structure (3) of the liquid crystal display device includes:

a liquid crystal display panel having one and another main surfaces;

a light guide plate having first and second main surfaces and being arranged to confront the first main surface thereof with the one main surface of the liquid crystal display panel; and Linear light sources being disposed along respective side edges of the first or second main surfaces of the light guide plate being opposite to one another; and an optical reflection plate having a two-dimensional optical reflection pattern and being arranged to be opposite to the second main surface of the light guide plate.

Brightness of each of the linear light sources increases one-dimensionally and gradually from one end of the linear light source toward another end thereof, and the respective one ends of the linear light sources are arranged on a diagonal of the first or second main surface of the light guide plate.

Distribution density of the optical reflection pattern provided two-dimensionally for the optical reflection plate is heightened gradually along the diagonal in accordance with the one-dimensional gradual decreases of the respective brightness of the linear light sources.

The brightness irregularity of each of the linear light sources relative to the one-dimensional direction (tube-axis direction) thereof is corrected by the distribution of the optical reflection pattern provided on the optical reflection plate, whereby the two-dimensional brightness distribution on another main surface of the liquid crystal display panel becomes regular so that a regular on-screen brightness distribution can be obtained.

In a structure (4) of the liquid crystal display device according to any of the structures (1) to (3), a prism sheet is provided between the one main surface of the liquid crystal display panel and the second main surface of the light guide plate.

In a structure (5) of the liquid crystal display device according to any of the structures (1) to (4), the linear light source is a cold cathode fluorescent lamp.

The invention is not limited to any of the above-described constructions nor the construction of any of embodiments which will be described later, and it goes without saying that various modifications can be made without departing from the technical ideas of the invention.

DETAILED DESCRIPTION

Figure 1:
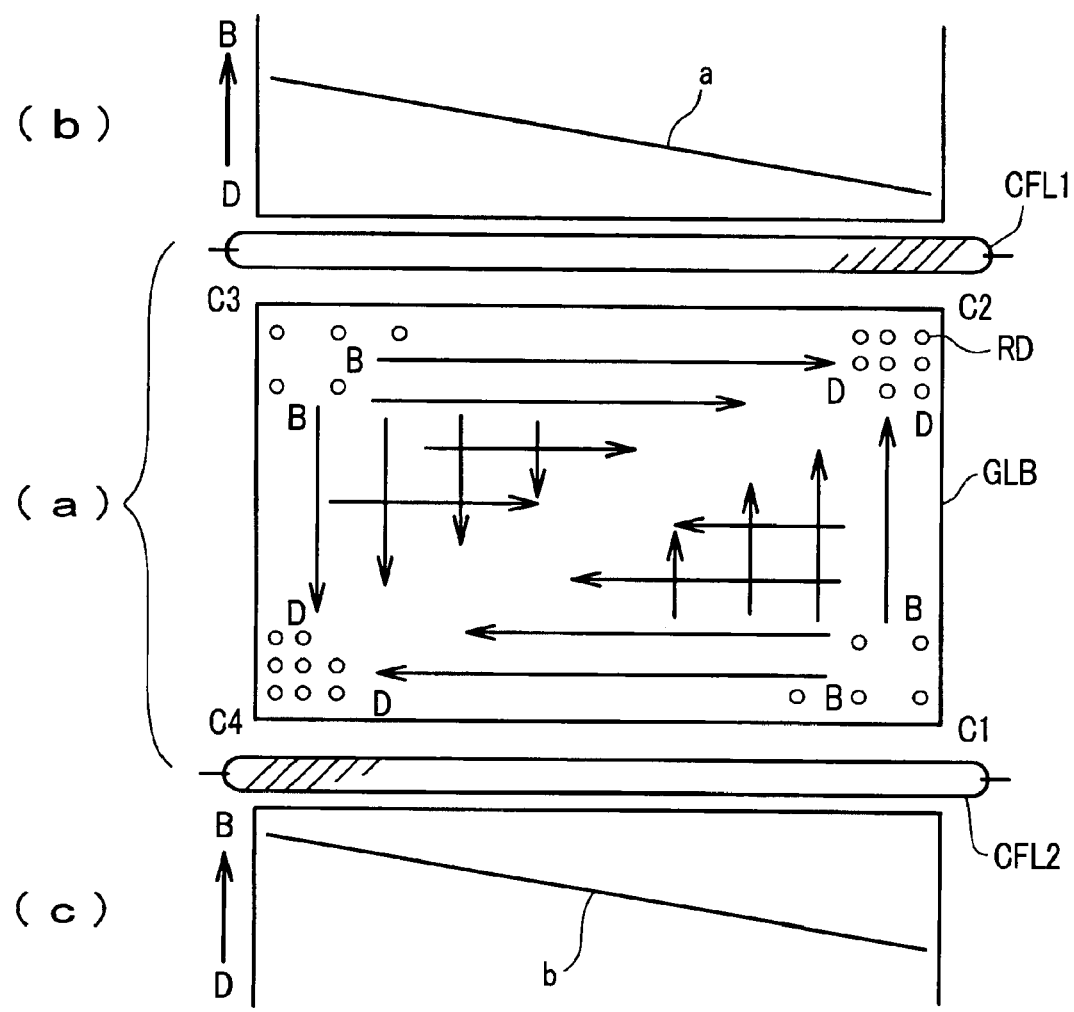
FIG. 1 is an explanatory view of a first embodiment of the liquid crystal display device according to the invention.

Embodiments of the invention will be described below in detail with reference to the drawings of the embodiments. FIG. 1 is an explanatory view of a first embodiment of the liquid crystal display device according to the invention. Part (a) of FIG. 1 is a layout view of a light guide plate and cold cathode fluorescent lamps, and Parts (b) and (c) of FIG. 1 show the brightness distributions of the respective cold cathode fluorescent lamps. Reference symbol GLB denotes the light guide plate, and the light guide plate GLB has an optical reflection pattern RD printed on its second main surface which is a back surface. Cold cathode fluorescent lamps CFL1 and CFL2 are respectively disposed along two side edges of the light guide plate GLB on opposite longer sides thereof.

The exhaust side of the first cold cathode fluorescent lamp CFL1 disposed on the upper side of FIG. 1 is positioned on the right-hand side of FIG. 1, while the exhaust side of the second cold cathode fluorescent lamp CFL2 disposed on the lower side of FIG. 1 is positioned on the left-hand side of FIG. 1. Namely, the exhaust-side ends of the first and second cold cathode fluorescent lamps CFL1 and CFL2 are disposed on a rightward ascending diagonal of the main surface of the light guide plate GLB. Each of the first and second cold cathode fluorescent lamps CFL1 and CFL2 exhibits a one-dimensional brightness distribution in which its brightness along its tube-axis direction is smallest on the exhaust side and is largest on the opposite side to the exhaust side.

The optical reflection pattern RD provided on the light guide plate GLB is made of an optical reflection film formed by screen printing or the like, and has a two-dimensional brightness distribution increasing gradually along the diagonal corresponding to the one-dimensional brightness distributions of the respective cold cathode fluorescent lamps CFL1 and CFL2 (the linear light sources). Each arrow shown in FIG. 1 indicates the direction in which the magnitude of reflection varies, and reference symbol D denotes a large reflection, while reference symbol B denotes a small reflection. The one-dimensional distribution of brightness of the first cold cathode fluorescent lamp CFL1 is shown in Part (b), while the one-dimensional distribution of brightness of the second cold cathode fluorescent lamp CFL2 is shown in Part (c).

The four corners of the light guide plate GLB are respectively denoted by C1, C2, C3 and C4 in Part (a) of FIG. 1. The optical reflection of the optical reflection pattern RD gradually increases from the corner C1 toward the corner C2 and also from the corner C3 toward the corner C2. In addition, the optical reflection of the optical reflection pattern RD gradually increases from the corner C1 toward the corner C4 and also from the corner C3 toward the corner C4. A density distribution of a pattern along each of the sides (C1–C2, C2–C3, C3–C4, and C4–C1) of the main surface of the light guide plate GLB is varied along at least one of the diagonals C1–C3 and C2–C4 thereof.

The length of each arrow shown in FIG. 1 represents the magnitude of reflection as a vector quantity, and the magnitude of reflection is largest on each side of the light guide plate GLB and decreases gradually toward the center thereof. Accordingly, the two-dimensional distribution of reflection magnitude of the light guide plate GLB as a whole increases gradually from the center of the light guide plate GLB and the corner C1 toward the corner C2 and also from the center of the light guide plate GLB and the corner C3 toward the corner C4. This distribution is referred to as the two-dimensional distribution along the diagonal which connects the corner C2 and the corner C4. The pattern along each of the sides (C1–C2, C2–C3, C3–C4, and C4–C1) of the main surface of the light guide plate GLB varying along the diagonal C2–C4 thereof can be also described to be varies in a direction toward the diagonal C1–C3.

Figure 2:
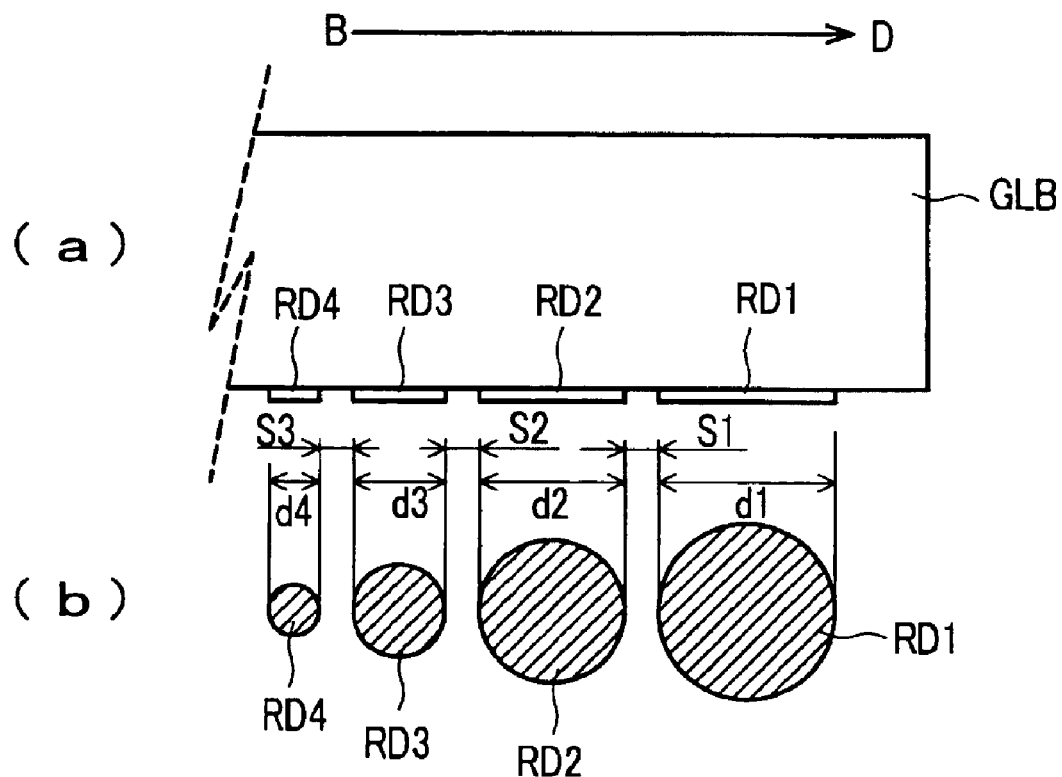
FIG. 2 is an explanatory view of a first example of an optical reflection pattern provided on a light guide plate.

FIG. 2 is an explanatory view of a first example of the optical reflection pattern provided on the light guide plate GLB. This example of the optical reflection pattern is made of dot-shaped reflection layers formed on the second main surface of the light guide plate GLB by screen printing. FIG. 2 shows a cross section of a portion near the corner C2 of FIG. 1 taken along the diagonal. In FIG. 2, reference numerals RD1, RD2, RD3, RD4, . . . denote circular dot-shaped reflection layers (reflection dots), and in a portion larger in optical reflection, the reflection dots become larger in diameter, that is, $d1>d2>d3>d4>$ . . . . The rate of variation in diameter corresponds to the brightness distributions (indicated by the arrows B→D) of the respective first and second cold cathode fluorescent lamps CFL1 and CFL2 shown in FIG. 1. The interval between each of the reflection dots is the same, that is, $S1=S2=S3=S4=$ . . . .

Figure 3:
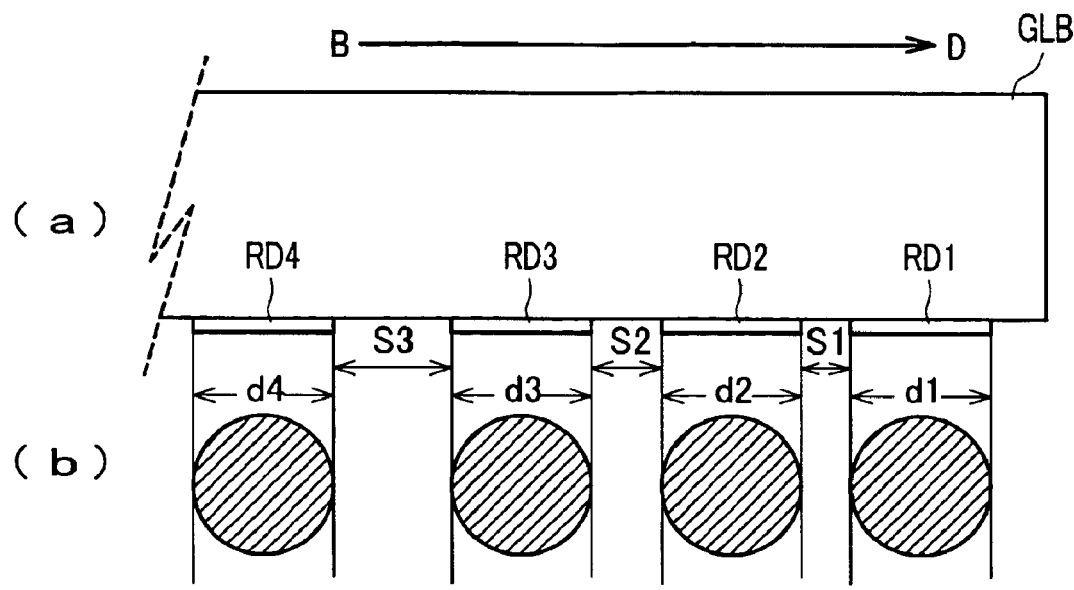
FIG. 3 is an explanatory view of a second example of the optical reflection pattern provided on the light guide plate.

FIG. 3 is an explanatory view of a second example of the optical reflection pattern provided on the light guide plate GLB. Similarly to the first example, the second example of the optical reflection pattern is made of dot-shaped reflection layers formed on the second main surface of the light guide plate GLB by screen printing. FIG. 3 shows a cross section of a portion near the corner C2 of FIG. 1 taken along the diagonal. In FIG. 3, reference numerals RD1, RD2, RD3, RD4, . . . denote reflection dots similar to those shown in FIG. 2, but the reflection dots have the same diameter, that is, d1=d2=d3=d4= . . . . In a portion larger in optical reflection, the interval between adjacent reflection dots becomes larger, that is, S1>S2>S3> . . . . The rate of variation in interval corresponds to the brightness distributions (indicated by the arrows B→D) of the respective cold cathode fluorescent lamps shown in FIG. 1.

Incidentally, the shape of the optical reflection pattern is not limited to either of the circles used in the first and second examples, and may also be a polygon, an indeterminate shape, a strip-like shape or any other shape that allows the area of reflection as a whole to become largest in each corner. Although the variation in brightness is shown herein by straight lines for the sake of simplicity in description, there is also a cold cathode fluorescent lamp of the type whose brightness varies as shown by curved lines. In this case, the density distribution of an optical reflection pattern to be formed on the light guide plate GLB is made to correspond to the brightness distribution shown by the curved lines.

Figure 4:
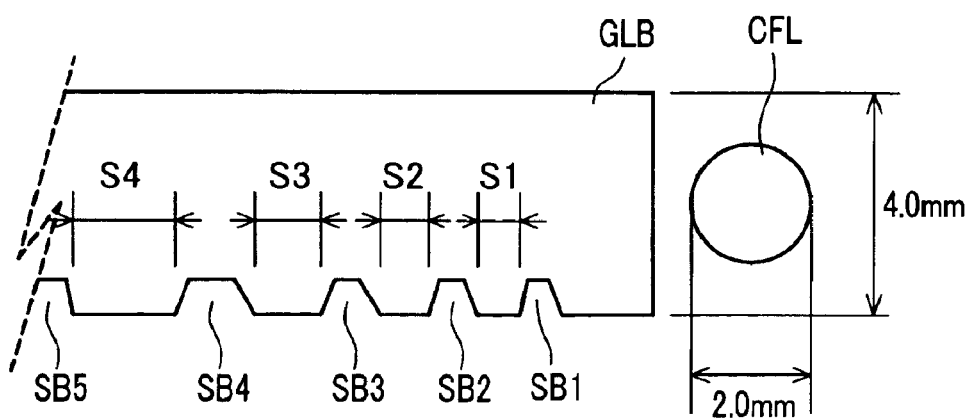
FIG. 4 is an explanatory view of a third example of the optical reflection pattern provided on the light guide plate GLB.

FIG. 4 is an explanatory view of a third example of the optical reflection pattern provided on the light guide plate GLB. The third example of the optical reflection pattern is made of concave portions (crimps) formed on the second main surface of the light guide plate GLB. FIG. 4 shows a cross section of a portion near the corner C2 of FIG. 1 taken along the diagonal. In FIG. 4, reference numerals SB1, SB2, SB3, SB4, SB5, . . . denote crimps, and in a portion larger in optical reflection, the interval between adjacent crimps becomes smaller (the density of the crimps becomes larger), that is, s1>s2>s3>s4> . . . . The rate of variation in density corresponds to the brightness distributions (indicated by the arrows B→D) of the respective cold cathode fluorescent lamps shown in FIG. 1. Incidentally, referring to one dimensional example, the thickness of the light guide plate GLB is 4.0 mm, and the diameter of each of the cold cathode fluorescent lamps CFL is 2.0 mm. This dimensional example also applies to each of the examples shown in FIGS. 2 and 3. These dimensions are merely one example.

Figure 5:
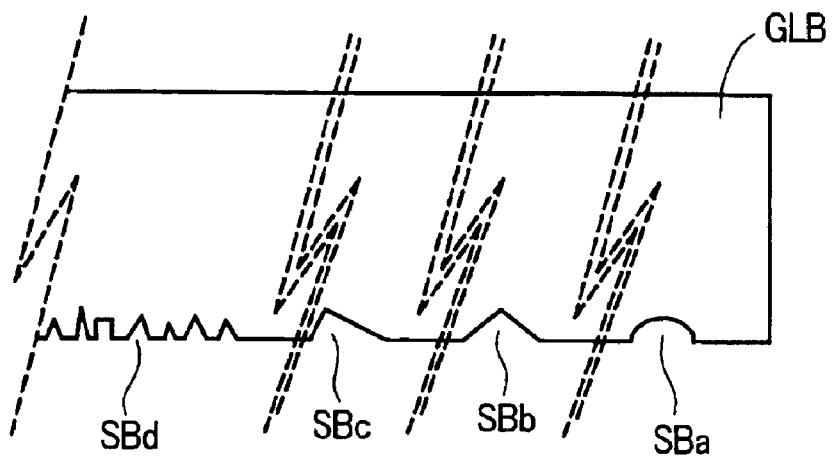
FIG. 5 is an explanatory view of another example of crimps provided on the light guide plate.

FIG. 5 is an explanatory view of another example of the crimps provided on the light guide plate GLB. Crimps SB have a disc-like shape SBa, triangular shapes SBb and SBc and other shapes. As shown in FIG. 5 as well as FIG. 4, these crimps SB are formed by providing protrusions corresponding to the crimps SB in a forming mold for the light guide plate GLB in advance. Crimps SBd are formed by sand blasting. The density of the crimps SB becomes higher in a portion larger in optical reflection. The rate of variation in density corresponds to the brightness distributions (indicated by the arrows B→D) of the respective cold cathode fluorescent lamps shown in FIG. 1. Although the variation in brightness is shown herein by straight lines for the sake of simplicity in description, there is also a cold cathode fluorescent lamp of the type whose brightness varies as shown by curved lines. In this case, the density distribution of an optical reflection pattern to be formed on the light guide plate GLB is made to correspond to the brightness distribution shown by the curved lines.

In accordance with the present embodiment, the brightness irregularity of each of the cold cathode fluorescent lamps CFL relative to the one-dimensional direction (tube-axis direction) thereof is corrected by the density distribution of the optical reflection pattern provided on the light guide plate GLB, whereby the two-dimensional brightness distribution on another main surface of the liquid crystal display panel becomes regular so that a regular on-screen brightness distribution can be obtained.

Figure 6:
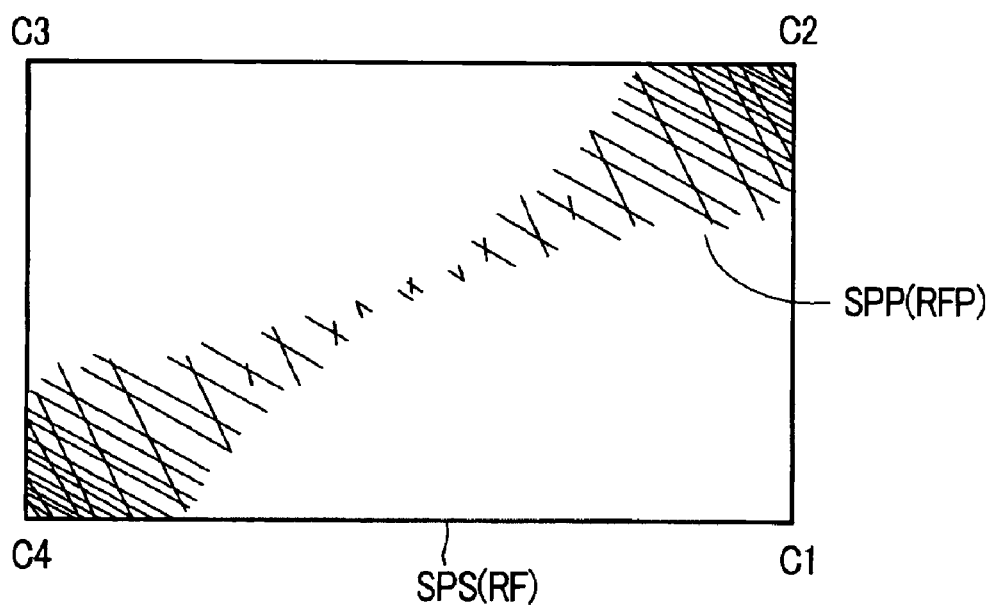
FIG. 6 is an explanatory view of second and third embodiments of the liquid crystal display device according to the invention.
Figure 8:
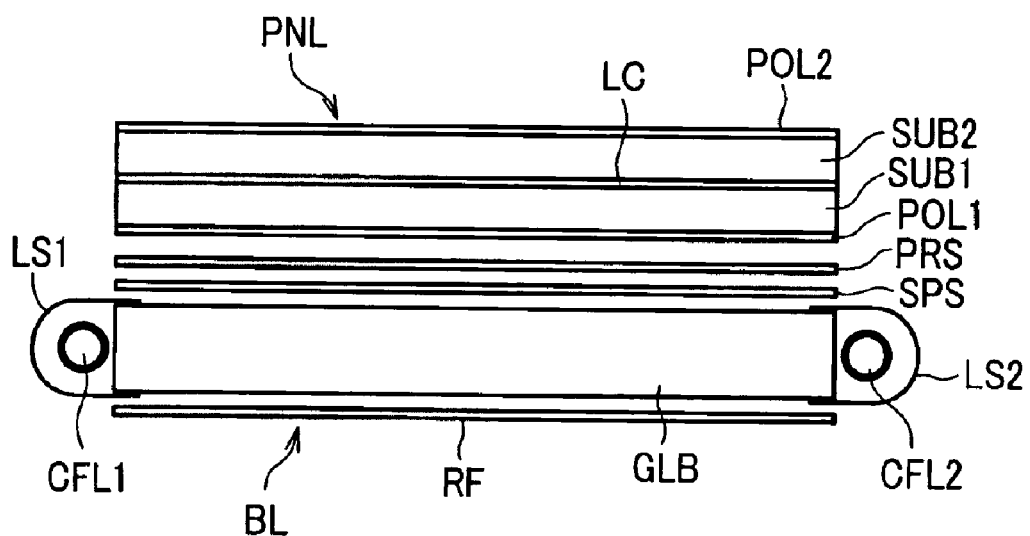
FIG. 8 is a cross-sectional view diagrammatically illustrating the essential structure of a liquid crystal display device using a backlight structure having cold cathode fluorescent lamps respectively disposed along two opposite side edges of a light guide plate.
Figure 9:
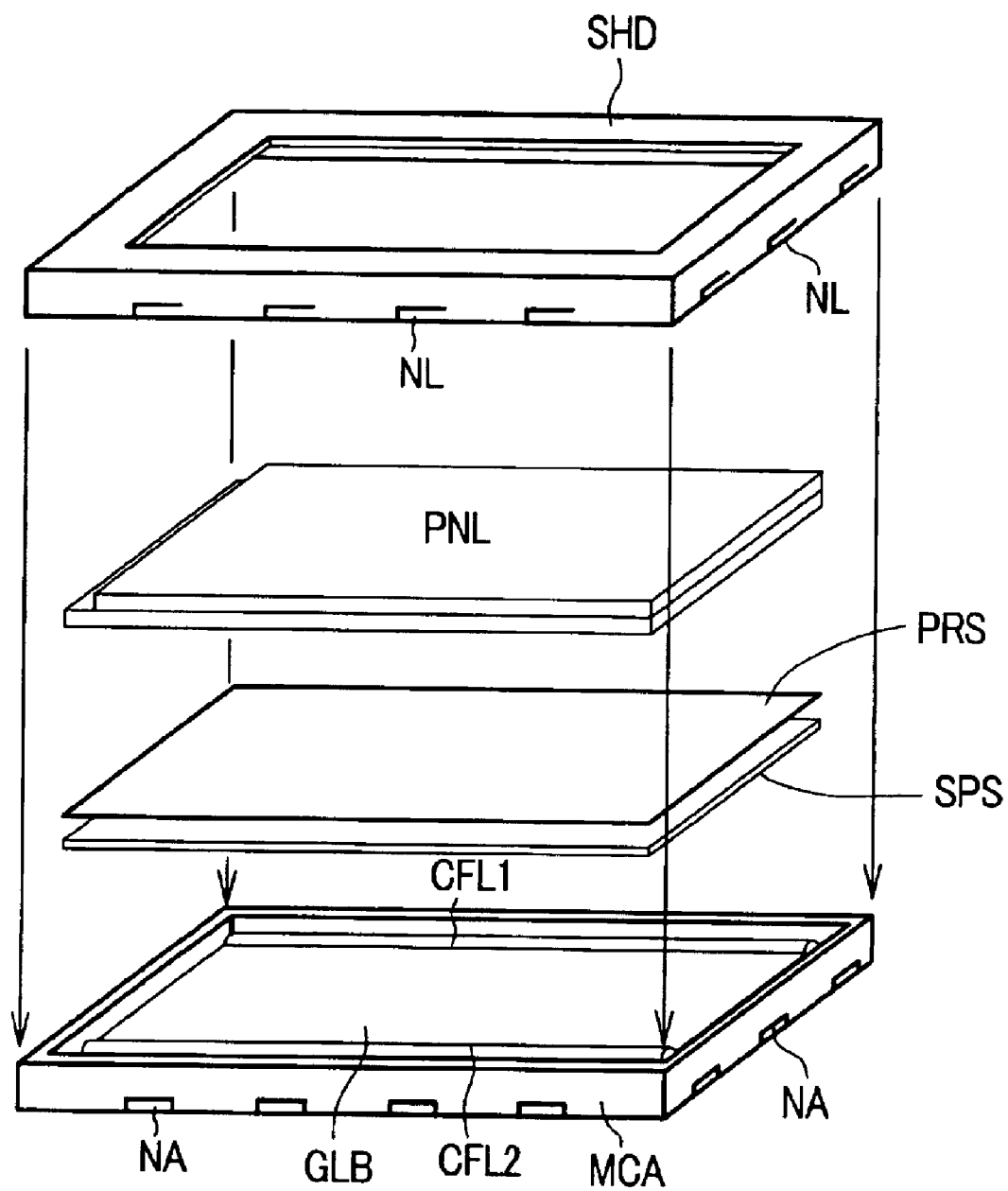
FIG. 9 is a developed perspective view illustrating the entire construction of the liquid crystal display device provided with the side edge backlight.

FIG. 6 is an explanatory view of second and third embodiments of the liquid crystal display device according to the invention. The second embodiment has a construction in which the optical diffusion pattern of an optical diffusion sheet SPS which constitutes the optical sheet shown in FIG. 8 is made to correspond to the brightness irregularity of each of the cold cathode fluorescent lamps CFL. The portions C1, C2, C3 and C4 shown in FIG. 6 correspond to the four corners of the light guide plate GLB shown in FIG. 1. The density of the optical diffusion pattern SPP of the optical diffusion sheet SPS shows two-dimensional distribution increasing gradually from each of sides of the optical diffusion sheet SPS to the diagonal thereof extended from the corner C2 thereof where one of the linear light sources CFL (disposed at an upper side in FIG. 6) has lower brightness to the corner C4 thereof where another of the linear light sources CFL (disposed at a lower side in FIG. 6) has lower brightness.

In accordance with the present embodiment, the brightness irregularity of each of the cold cathode fluorescent lamps CFL relative to the one-dimensional direction (tube-axis direction) thereof is corrected by the density distribution of the optical diffusion pattern SPP provided on the optical diffusion sheet SPS, whereby the two-dimensional brightness distribution on another main surface of the liquid crystal display panel becomes regular so that a regular on-screen brightness distribution can be obtained.

The third embodiment of the invention has a construction in which an optical reflection pattern of an optical reflection plate RF disposed on the second main surface of the light guide plate GLB shown in FIG. 8 is made to correspond to the brightness irregularity of each of the cold cathode fluorescent lamps CFL. The density of the two-dimensional distribution of the optical reflection pattern RFP of the optical reflection plate RF in this embodiment shows two-dimensional distribution as FIG. 6 shows which increases gradually from each of sides of the optical reflection plate RF to the diagonal thereof extended from the corner C2 thereof where one of the linear light sources CFL (at the upper side in FIG. 6) has lower brightness to the corner C4 thereof where another of the linear light sources CFL (at the lower side in FIG. 6) has lower brightness.

In accordance with the present embodiment, the brightness irregularity of each of the cold cathode fluorescent lamps CFL relative to the one-dimensional direction (tube-axis direction) thereof is corrected by the distribution of the optical reflection pattern RFP provided on the optical reflection plate RF, whereby the two-dimensional brightness distribution on another main surface of the liquid crystal display panel becomes regular so that a regular on-screen brightness distribution can be obtained.

In each of the above-described embodiments, a two-dimensional brightness correction pattern is only provided on one of the light guide plate GLB, the optical diffusion sheet SPS and the optical reflection plate RE However, brightness correction can also be effected as a whole by forming similar patterns on two or all of the light guide plate GLB, the optical diffusion sheet SPS and the optical reflection plate RF and combining the patterns formed on the two or all. In this case, those individual patterns are prepared so that the patterns constitute a required brightness correction pattern when they are combined.

Figure 7:
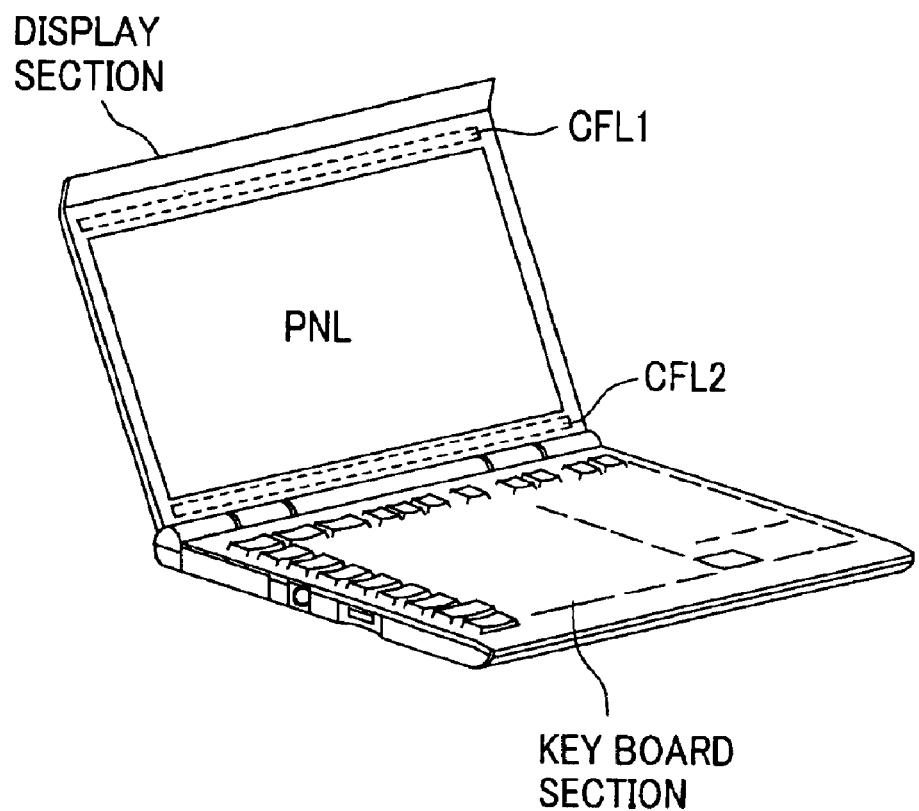
FIG. 7 is a view showing an external appearance of a notebook personal computer which is one example of an electronic apparatus in which a liquid crystal display device according to the invention is mounted.

FIG. 7 is a view showing an external appearance of a notebook personal computer which is one example of an electronic apparatus in which a liquid crystal display device according to the invention is mounted. The liquid crystal display device mounted in the display section of the notebook personal computer is any one of the above-described embodiments. In FIG. 7, the cold cathode fluorescent lamps CFL1 and CFL2 provided on the top and bottom sides of a liquid crystal display panel PNL which constitutes the screen of the display section are shown by imaginary lines. It goes without saying that the liquid crystal display device according to the invention is not limited to the notebook personal computer shown in FIG. 7 and can be similarly applied to a display monitor, a television set and a display device for other equipment, all of which have a side edge backlight having cold cathode fluorescent lamps respectively disposed along two opposite sides of a light guide plate.

As is apparent from the foregoing description, according to the invention, it is possible to provide a small-sized and lightweight liquid crystal display device having a bright screen in which the irregularity of the on-screen brightness distribution of its liquid crystal display panel due to the brightness irregularity of each linear light source relative to the tube-axis direction thereof is solved to level the on-screen brightness distribution.

What is claimed is:

1. A liquid crystal display device comprising:

a liquid crystal display panel having one and another main surfaces;

a light guide plate having a first main surface facing the one main surface of the liquid crystal display panel and a second main surface on which an optical reflection pattern is formed to be distributed two-dimensionally; and linear light sources being disposed along respective side edges of the first or second main surfaces of the light guide plate being opposite to one another, wherein brightness of each of the linear light sources increases one-dimensionally and gradually from one least bright end of the linear light source toward one brightest end thereof, the respective least bright ends of the linear light sources are arranged on a diagonal of the first or second main surface of the light guide plate, and wherein a distribution density of the optical reflection pattern provided two-dimensionally for the light guide plate is heightened gradually from a center of the second main surface of the light guide plate along the diagonal in accordance with a combinational effect of the one-dimensional gradual decreases of the brightness of the linear light sources.

2. A liquid crystal display device according to claim 1, wherein a prism sheet is provided between the one main surface of the liquid crystal display panel and the second main surface of the light guide plate.

3. A liquid crystal display device according to claim 1, wherein the linear light source is a cold cathode fluorescent lamp.

4. A liquid crystal display device according to claim 1, wherein the distribution density of the optical reflection pattern is further heightened gradually from a first corner to a second corner as well as from a third corner to a fourth corner of the second main surface of the light guide plate, the second and fourth corners are adjacent to the least bright ends of the linear light sources respectively, and the first and third corners are adjacent to the brightest ends of the linear light sources respectively.

5. A liquid crystal display device comprising:

a liquid crystal display panel having one and another main surfaces;

a light guide plate having first and main surfaces and being arranged to confront the first main surface thereof with the one main surface of the liquid crystal display panel;

linear light sources being disposed along respective side edges of the first or second main surfaces of the light guide plate being opposite to one another; and an optical reflection plate having a two-dimensional optical reflection pattern and being arranged to face the second main surface of the light guide plate, wherein brightness of each of the linear light sources increases one-dimensionally and gradually from one least bright end of the linear light source toward one brightest end thereof, the respective least bright ends of the linear light sources are arranged on a diagonal of the first or second main surface of the light guide plate, and wherein a distribution density of the optical reflection pattern provided two-dimensionally for the optical reflection plate is heightened gradually from a center of the optical reflection plate along the diagonal in accordance with a combinational effect of the one-dimensional gradual decreases of the brightness of the linear light sources.

6. A liquid crystal display device according to claim 5, wherein the linear light source is a cold cathode fluorescent lamp.

* * * * *